E. O'NEILL & T. E. COMLY.
TIRE COVERING.
APPLICATION FILED MAR. 27, 1916.
1,295,579.
Patented Feb. 25, 1919.
2 SHEETS—SHEET 1.
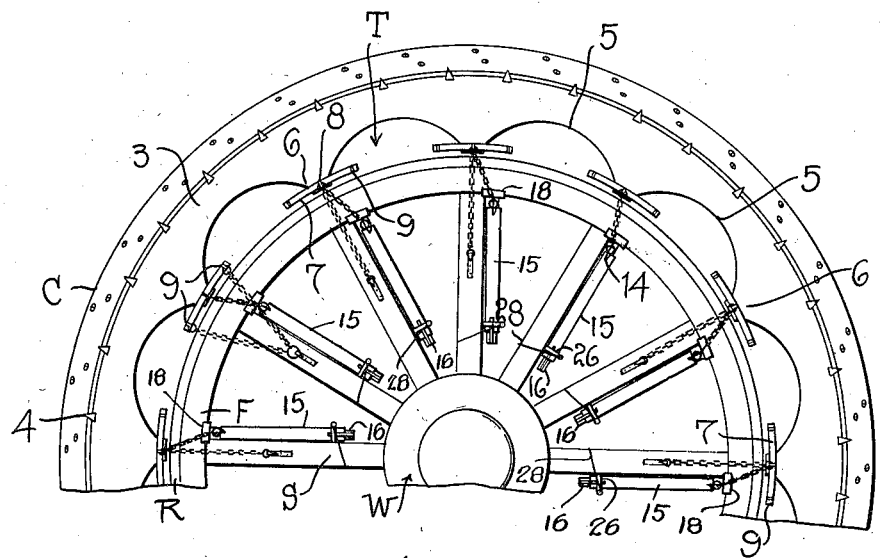
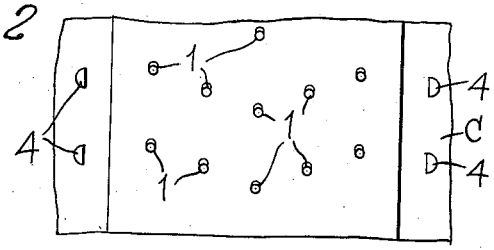
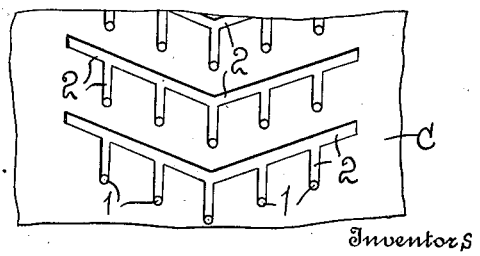
Inventors
E. O'NEILL
T. E. COMLY
By Watson E. Coleman
Attorney E. O'NEILL & T. E. COMLY.
TIRE COVERING.
APPLICATION FILED MAR. 27, 1916.
1,295,579.
Patented Feb. 25, 1919.
2 SHEETS—SHEET 2.
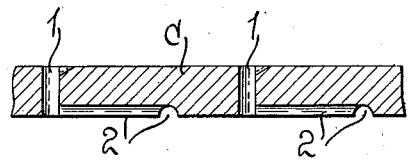
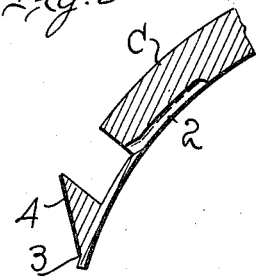
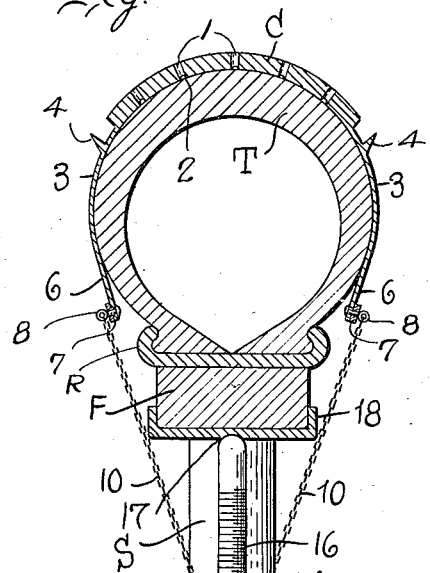
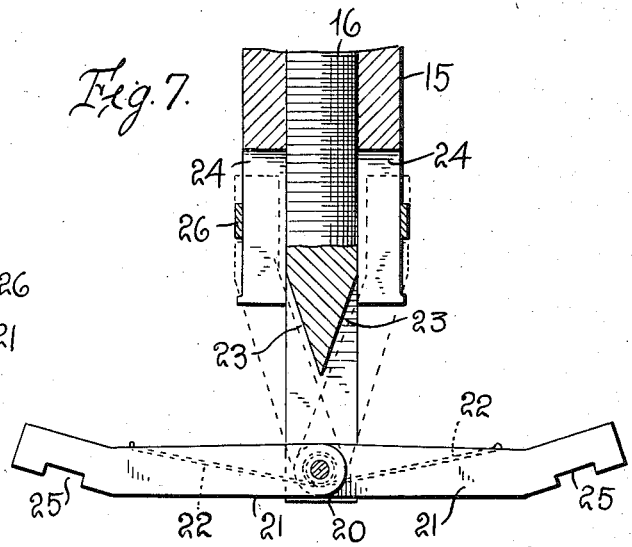
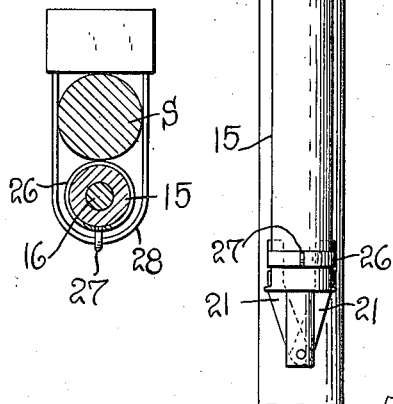
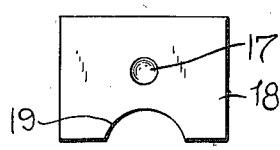
Inventors
E. O'NEILL
T. E. COMLY
By Watson E. Coleman
Attorney

UNITED STATES PATENT OFFICE.

EUGENE O'NEILL AND T ELWOOD COMLY, OF LEWISTON, IDAHO.

TIRE-COVERING.

1,295,579.
Specification of Letters Patent.  Patented Feb. 25, 1919.

Application filed March 27, 1916.  Serial No. 87,113.

*To all whom it may concern:*

Be it known that we, EUGENE O'NEILL and T ELWOOD COMLY, citizens of the United States, residing at Lewiston, in the county of Nez Perce and State of Idaho, have invented certain new and useful Improvements in Tire-Coverings, of which the following is a specification, reference being had to the accompanying drawings.

This invention relates to certain improvements in tire coverings and is primarily an improvement on the tire covering as embodied in Patent No. 627,483 dated June 27, 1899 and granted to T. E. Comly; and it is an object of the invention to provide a tire covering of this type wherein means is provided for directing or deflecting the matter collected by the covering such as water, soft mud or the like as discharged from the covering toward the surface upon which the device travels.

It is also an object of our invention to provide novel and improved means whereby the covering may be effectively held in applied position upon a wheel or the tire therefor.

The invention consists in the details of construction and in the combination and arrangement of the several parts of our improved tire covering whereby certain important advantages are attained and the device is rendered simpler, less expensive and otherwise more convenient and advantageous for use, all as will be hereinafter more fully set forth.

The novel features of the invention will hereinafter be definitely claimed.

In order that our invention may be the better understood, we will now proceed to describe the same with reference to the accompanying drawings, wherein—

Figure 1 is a fragmentary view in side elevation of a wheel structure showing a tire covering constructed in accordance with an embodiment of our invention applied thereto;

Fig. 2 is a fragmentary view in top plan of the tire covering as herein embodied;

Fig. 3 is a bottom plan view of the device as disclosed in Fig. 2;

Fig. 4 is a fragmentary longitudinal sectional view taken through the covering as herein included on an enlarged scale;

Fig. 5 is a fragmentary transverse section on an enlarged scale illustrating certain details of the invention as herein disclosed;

Fig. 6 is a view partly in section and partly in elevation illustrating a tire covering arranged in accordance with a further embodiment of our invention;

Fig. 7 is an enlarged fragmentary view partly in elevation and partly in section of the securing means included in Fig. 6;

Fig. 8 is a view in bottom plan of the plate included in the second embodiment of our invention as herein set forth; and Fig. 9 is a view partly in section and partly in elevation illustrating a means for holding the tightening member to an adjacent spoke.

As disclosed in the accompanying drawings, W denotes a wheel including the felly F, the spokes S and the tire T, said tire T being of a pneumatic type, and C denotes our improved covering comprising an annular member adapted to embrace the tread portion of the tire and provided with a series of apertures 1 passing therethrough and having its inner face provided with the passages 2 connecting the interior of the apertures 1 with the outside edges of the cover C, as is particularly embodied in the prior patent to T. E. Comly, 627,483 hereinbefore referred to.

In the present embodiment, the marginal portions of the cover C are provided with the annular extensions 3 provided with the outwardly directed annular series of lips or tongues 4 which serve to direct or deflect the matter discharged through the passages 2 toward the surface over which the wheel W travels and whereby indiscriminate throwing of said discharging matter is eliminated.

The annular extensions 3 have their free or inner marginal portions scalloped, as indicated at 5, to afford the tongue 6.

Disposed transversely of each of said tongues 6 and suitably secured thereto is a rod 7 having an intermediate eye 8 and the end eyes 9, and coacting with the intermediate eye 8 is a flexible member 10, preferably a chain, which is adapted to be engaged with the hook member 14 extending laterally from the outer end of the tubular member 15.

Threaded through the tubular member 15 is the rod 16 having its outer end rounded and adapted to be seated within the socket 17 produced in the under face of the cuplike plate 18 which is adapted to underlie the felly F and is provided in one end with the notch or recess 19 adapted to receive an adjacent spoke S, and whereby said spoke will serve as a guiding means for said plate 18 in its movement under the influence of the rod 16.

The inner end of the rod 16 is bifurcated and within the kerf 20 is pivotally mounted the extremities of the arms or levers 21 which are adapted to be automatically extended through the medium of the spring 22, as is believed to be clearly disclosed in the accompanying drawings. The arms or levers 21 are adapted to be received within the slots 23 formed in the opposed sides of the inner portion of the rod 16 and also extend within the recesses 24 produced in the inner end of the tubular member 15.

The outer edges of the arms or levers 21 adjacent their free extremities are provided with the notches 25 in which is adapted to be seated the ring 26 slidably mounted upon the tubular member 15 and whereby the arms or levers 21 may be maintained in their folded adjustment. As herein disclosed, the ring 26 has in connection therewith the ring member 27 adapted to be suitably secured to the spoke S as indicated at 28. We do not wish to be understood as limiting ourselves to any particular manner in anchoring the ring 27 to the spoke S as it has been fully demonstrated in practice that this may be accomplished in various ways.

When in extended adjustment, the arms or levers 23 afford a means whereby the rod 16 may be axially rotated in order to impart the requisite movement to the tubular member 15 in order to effectively secure the cover C' upon the tire or to permit the cover to be removed therefrom.

From the foregoing description, it is thought to be obvious that a tire covering constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

We claim:

1. In combination with a wheel including a rim and a tire mounted thereon, a cover adapted to embrace the tread of the tire, a tubular member arranged inwardly of the tire, means for connecting the cover with the outer end of the tubular member, a rod threaded through the tubular member and coacting with the rim of the wheel, a lever pivotally connected with the inner end of the rod and affording a means for axially rotating the same, means carried by the tubular member and coacting with the lever for holding the lever in a direction substantially longitudinally of the rod, and means for automatically moving the lever in a downward direction upon release of the first named means.

2. A tire covering adapted to embrace the tread of a tire and having a series of apertures passing therethrough and provided with discharge passages connecting the interior of the apertures with the marginal portions of the cover, and an annular series of outstanding tongues carried by each marginal portion of the cover spaced from and in close proximity to said discharge passages and in alinement therewith for deflecting the matter discharged by the discharge passages in a direction toward the tread of the tire.

EUGENE O'NEILL.
T ELWOOD COMLY.

Witnesses to signature of Eugene O'Neill:
 LAURENCE E. O'NEILL,
 FINIS BENTLEY.

Witnesses to signature of T Elwood Comly:
 EDWIN BLOOM,
 L. E. MENNELL.